(12) United States Patent
Zhao et al.

(10) Patent No.: US 9,846,655 B1
(45) Date of Patent: Dec. 19, 2017

(54) MANAGING PROCESSING TASKS IN STORAGE SYSTEMS

(71) Applicant: EMC Corporation, Hopkinton, MA (US)

(72) Inventors: Junping Zhao, Beijing (CN); Philippe Armangau, Acton, MA (US); Fenghao Zhang, Beijing (CN); Gang Xie, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 332 days.

(21) Appl. No.: 14/581,620

(22) Filed: Dec. 23, 2014

(51) Int. Cl.
| | |
|---|---|
| *G06F 12/122* | (2016.01) |
| *G06F 13/14* | (2006.01) |
| *G06F 13/00* | (2006.01) |
| *G06F 12/0871* | (2016.01) |
| *G06F 13/16* | (2006.01) |
| *G06F 12/00* | (2006.01) |
| *G06F 3/06* | (2006.01) |

(52) U.S. Cl.
CPC ............ *G06F 12/122* (2013.01); *G06F 3/061* (2013.01); *G06F 3/0604* (2013.01); *G06F 3/0631* (2013.01); *G06F 12/00* (2013.01); *G06F 12/0871* (2013.01); *G06F 13/00* (2013.01); *G06F 13/14* (2013.01); *G06F 13/16* (2013.01); *G06F 13/161* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 2011/0176556 | A1* | 7/2011 | Guo | ............... H04L 1/0041 370/474 |
| 2012/0250041 | A1* | 10/2012 | Iwasaki | ............... G06F 3/122 358/1.9 |
| 2015/0161048 | A1* | 6/2015 | Patil | ............... G06F 17/30132 711/141 |
| 2016/0328301 | A1* | 11/2016 | Parakh | ............... G06F 12/0802 |

\* cited by examiner

*Primary Examiner* — Midys Rojas
(74) *Attorney, Agent, or Firm* — Krishnendu Gupta; Deepika Bhayana

(57) ABSTRACT

A method is used in managing processing tasks in storage systems. A set of tasks is received for processing. A type of the set of tasks is identified. Based on the type of the set of tasks, a determination is made as to whether to add data objects associated with the set of tasks to a used object list managed in conjunction of a cache of the system for accessing the data objects associated with the set of tasks. The cache is configured to store the data objects of the storage system. A portion of a memory of the storage system is reserved as the cache.

20 Claims, 8 Drawing Sheets

MANAGING PROCESSING TASKS IN STORAGE SYSTEMS

BACKGROUND

Technical Field

This application relates to managing processing tasks in storage systems.

Description of Related Art

Computer systems may include different resources used by one or more host processors. Resources and host processors in a computer system may be interconnected by one or more communication connections. These resources may include, for example, data storage devices such as file servers and those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance. File system accesses may be serviced from the buffer cache rather than read from the disk, thereby saving the delay associated with disk I/O access and increasing performance of the data storage system.

One of the functions of the operating system of a data storage system is to allocate pages to applications. The operating system maintains a 'free list', which is a list of pages that are available for allocation to applications. When an application requires one or more pages, the operating system may allocate a page from either the free list or preempt a page from the buffer cache. When client applications no longer need pages, they are returned to the free list.

The performance of applications is heavily influenced by the speed with which an application can retrieve data. As such, it is important to cache as much data as possible to improve performance of the data storage system.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be as many as five levels of indirect blocks arranged in a hierarchy depending upon the size of a file where each level of indirect blocks includes pointers to indirect blocks at the next lower level.

Although existing various methods provide reasonable means of providing access to data and metadata, with the explosion in the amount of data being generated, the resources needed for backup, archive, and restore are rising dramatically. It may be difficult or impossible to manage efficient access to data and metadata and caches in data storage systems.

SUMMARY OF THE INVENTION

A method is used in managing processing tasks in storage systems. A set of tasks is received for processing. A type of the set of tasks is identified. Based on the type of the set of tasks, a determination is made as to whether to add data objects associated with the set of tasks to a used object list managed in conjunction of a cache of the system for accessing the data objects associated with the set of tasks. The cache is configured to store the data objects of the storage system. A portion of a memory of the storage system is reserved as the cache.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
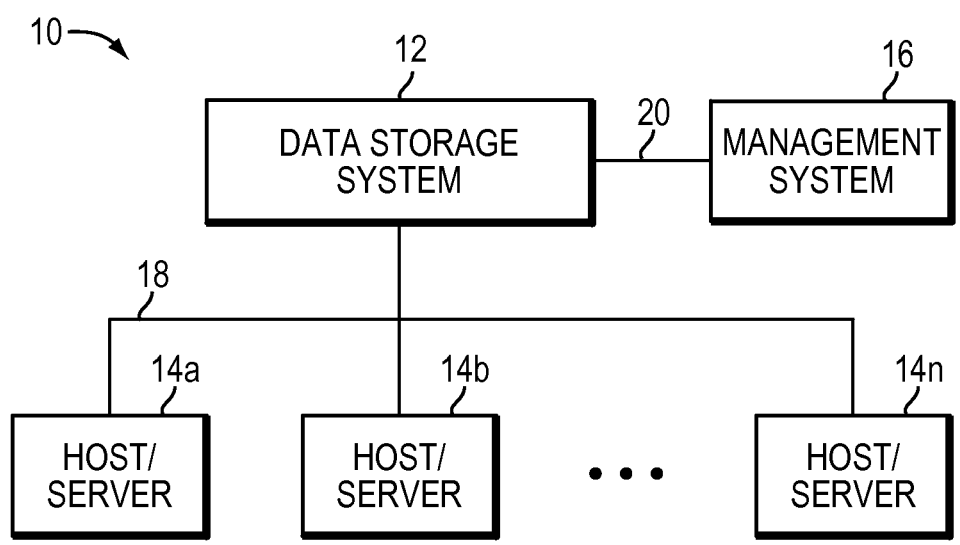
FIGS. 1-2 are examples of an embodiment of a computer system that may utilize the techniques described herein.

Described below is a technique for use in managing processing tasks in storage systems, which technique may be used to provide, among other things, receiving a set of tasks for processing, identifying a type of the set of tasks, and based on the type of the set of tasks, making a determination as to whether to add data objects associated with the set of tasks to a used object list managed in conjunction of a cache of the system for accessing the data objects associated with the set of tasks, where the cache is configured to store the data objects of the storage system, where a portion of a memory of the storage system is reserved as the cache.

Generally, a file system data that is read from disks and written to disks is cached in a memory (such as volatile memory) of a data storage system. Caching of the file system data implies that read operations read the file system data from the memory, rather than from a physical disk. Correspondingly, write operations may write the file system data to the memory rather than to the disk. Further, a file system data may include metadata of files of the file system and contents of the files. A buffer cache pool is created from a portion of a volatile memory of a data storage system where the portion of the volatile memory is apportioned into buffer cache objects (also referred to as "buffer cache page" or "buffer cache block") in such a way that each buffer cache object is represented by a buffer cache descriptor. The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool. The buffer cache pool caches data and/or metadata of a file system which includes directory contents, file status information (e.g., access time, last modification time, size, permission bits), and file system structures (such as indirect blocks, inode, cylinder group blocks and per-block metadata).

Generally, data and/or metadata of a file system is referred to and updated frequently, thus caching data and/or metadata of the file system in a volatile memory of a data storage system improves I/O performance of the file system. Thus, an application may access data and/or metadata stored in the volatile memory, thereby avoiding or reducing the need to retrieve data and/or metadata of the file system from a disk. Further, metadata of a file system includes a mapping of a logical address of data of the file system to a physical address of data of the file system. Thus, caching as much data and/or metadata of a file system as possible in a volatile memory of a data storage system increases I/O performance of the file system.

Generally, a mechanism of lists and "hints" is used to manage buffer cache blocks of the buffer cache pool. In a data storage system using the mechanism of lists and hints, a buffer cache block is allocated to store data and/or metadata of a file system so that the file system may access the buffer cache pool to retrieve the data and/or metadata when performing I/O operations on the file system. In such a system, when a buffer cache block that is allocated for storing metadata is released, the buffer cache block is labeled with a revision number, and the buffer cache block is added to a list (or queue) in a least recently used manner. The process of labeling a buffer cache block with a revision number before releasing the buffer cache block is known as creating a "hint" for the buffer cache block. Creating a hint for a buffer cache block enables an application to access information stored in the buffer cache block even after the buffer cache block has been released as long as the buffer cache block has not been reused. Additionally, buffer cache blocks released to the list may be reused to store data and/or metadata of a file system when the buffer cache pool does not have free buffer cache blocks available for allocation. The process of reusing released buffer cache blocks is also known as "recycling", which is performed by removing a buffer cache block from the list in the least recently used manner such that the removed buffer cache block represents the first buffer cache block that has been released to the list compared to other buffer cache blocks existing on the list. Thus, a buffer cache block removed from the list in the least recently used manner represents the oldest buffer cache block on the list that has been referenced by an application. Consequently, the oldest buffer cache block is least likely to be referenced by the application again at a later time. When a buffer cache block is reused from the list in the least recently used manner, the revision number of the buffer cache block is updated to indicate that the hint of the buffer cache block is no longer valid. Thus, in such a case, contents of the buffer cache block may no longer be retrieved by simply accessing the buffer cache block.

Generally, if an application performing I/O operations on a file system requires access to metadata and/or data of the file system stored in a buffer cache block that has been released to a list in the least recently used manner, the application may retrieve the released buffer cache block by using the revision number ("hint") of the buffer cache block. If the buffer cache block has not been recycled (i.e., the hint is deemed valid), the buffer cache block is removed from the least recently used list and provided to the application. However, if the buffer cache block has been recycled, the buffer cache block may not be retrieved at all as the revision of the buffer cache block indicates that the hint created for the buffer cache block is no longer valid, which in turn means that contents (data and/or metadata) of the buffer cache block may have changed.

Further, a cache may be a global cache that stores data and metadata objects (e.g., indirect blocks, virtual block pointers) of one or more files of file systems in a data storage system to store a single instance of a metadata object and/or a data object in a memory of the data storage system when the metadata object and/or the data object is shared across the one or more files of file systems. Thus, a single instance of a metadata object and/or a data object of a file that is shared across one or more versions of the file is stored in the global cache allowing the one or more versions of the file to access the single instance of the metadata object.

Generally, a least recently used list (also referred to herein as "LRU" or "reusable list") is associated with a cache of a data storage system such that a metadata object and/or data object is added to the LRU list in a least recently used manner when a client releases a reference to the metadata object and/or the data object which was provided to the client from the cache. Further, in such a system, a metadata object and/or a data object that is added to the LRU list is either reclaimed by a client or initialized as a free metadata and/or data object. Thus, in such a system, when a client requires a buffer cache entry from the cache, an entry is removed from the head of the LRU list and provided to the client. Further, in such a system, when an entry that has been provided to a client from the LRU list is released by the client, the entry is added to the LRU list at the end of the LRU list in a least recently used manner. Further, in such a system, when the cache is empty, a new block entry is allocated, added to the cache, and provided to a client such that when the client releases the block entry, the block entry is added to the LRU list in least recently used manner. In such a system, when a client attempts to reclaim a block entry using a hint, the cache is searched to find the block entry and the block entry is removed from the LRU list upon finding the block entry.

Generally, a workload executed on a storage system is a set of requests (also referred to herein as "tasks"). The character of a storage workload may be broken down into several characteristics—random vs. sequential I/O, large vs. small I/O request size, read vs. write ratio, and degree of parallelism. The characteristics of a particular workload indicate how it interacts with components of a storage system and determine the performance of a storage system environment under a given configuration. Understanding disk I/O workload characteristics for applications and optimizing storage workloads is of high importance to organizations as performance of the applications depends upon how various components (e.g. cache, LRU list) of a storage system are utilized.

Thus, a workload may include random workload and sequential workload. A random workload includes a set of random tasks that are randomly distributed over a disk surface. A sequential workload includes a set of sequential tasks that follows a sequential access pattern where a subsequent task of the set of sequential tasks access a data block that is immediately after the a data block accessed by a previous task. Examples of sequential workloads include backup-to-disk operations and writing of SQL transaction log files and random workloads may include OLTP ("Online Transaction Processing") database access. Further, storage workloads may be a mix of random and sequential access.

In a storage system, more and more data-intensive functionality and features such as data deduplication, compression, data analysis, and truncate of a large file or LUN for reclaiming storage are being added where such functionality and features generally include sequential workloads. Further, in a storage system, processing of sequential workloads may occur concurrently with other types of workloads (such as non-sequential, random) executing in the storage system thereby competing for storage system resources.

Conventionally, a list such as a least recently used list is used to manage a cache of a storage system that may store data objects required for processing tasks of a storage workload executed on the storage system. In such a conventional case, the cache provides fast access of the data objects for processing. Typically, a data object is stored in cache and added to a least recently used list based on an assumption that the data object may be accessed more than once in a short period of time. However, in a sequential workload, a set of data objects are accessed in a sequential pattern. Thus, a probability that a data object may be accessed more than once in a short period of time by a sequential workload is low because the sequential workload includes sequential tasks that do not include any reference of locality and once a data object is retrieved and processed, the sequential workload does not access the same data object again until the sequential workload is executed again which may take anywhere from few hours to few days. Thus, in a conventional system, storing data objects associated with a sequential workload in a cache and adding such data objects to a least recently used list provides little or no benefit to performance of the sequential workload, instead impacts performance of a system. Further, in such a conventional system, every time an entry associated with a data object is removed from a least recently used list, a lock is acquired before removing the entry and released after the entry is removed. Similarly, in such a conventional system, every time an entry associated with a data object is added back to the least recently used list, a lock is acquired before adding the entry and released after the entry is added. Consequently, in such a conventional system, a lock of a least recently used list may be acquired and released a large number of times thereby increasing CPU consumption, lock contention, lock collisions, cache contention, and write/read latency. Further, in such a conventional system, a sequential workload including a large number of sequential tasks may access a large number of data objects and store such large number of data objects in a cache and add them to a least recently used list. Consequently, in such a conventional system, such a sequential workload with a large number of sequential tasks may consume a large portion of a cache and a least recently used list in a short period of time thereby triggering removal of old entries from the cache and least recently used list to accommodate additional space for data objects for the sequential tasks. In such a conventional system, old entries that are removed from a cache and least recently used list to accommodate data objects for a sequential workload may include a reference of locality that may be accessed multiple times. Thus, in such a conventional system, removal of entries from a cache and a least recently used list that may include a reference of locality decreases performance of a system and increases CPU contention as there is a high probability that such entries are retrieved from a storage device again and stored back in the cache and added to the least recently used list in a short period of time. A goal of the current invention is to eliminate or reduce impact of sequential workloads on non-sequential workloads executing concurrently in a storage system and achieve a high throughput for the sequential workloads.

By contrast, in at least some implementations in accordance with the technique as described herein, data objects associated with sequential workloads are not added to a least recently used list and storage space used by such data objects in a cache is reclaimed after the data objects are processed by the sequential workloads. Thus, in at least one embodiment of the current technique, based on characteristics of a storage workload and how the storage workload process data objects, a least recently used list is used to add data objects associated with non-sequential workloads only.

In at least some implementations in accordance with the current technique as described herein, the use of the managing processing tasks in storage systems technique can provide one or more of the following advantages: improving efficiency of a data storage system by efficiently managing cache and entries in least recently used list, improving performance of a storage system by reducing the number of times a lock is acquired and released for updating a least recently used list, improving I/O performance of a storage system by reducing CPU consumption, lock contention, lock collisions and read/write latency by efficiently using a least recently used list and a cache, improve I/O performance of sequential workloads by efficiently accessing data objects associated with the sequential workloads, improve storage space utilized by a cache by reclaiming storage space associated with data objects of a sequential workload, improve performance of a cache system by efficiently hashing and searching data objects in the cache system.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
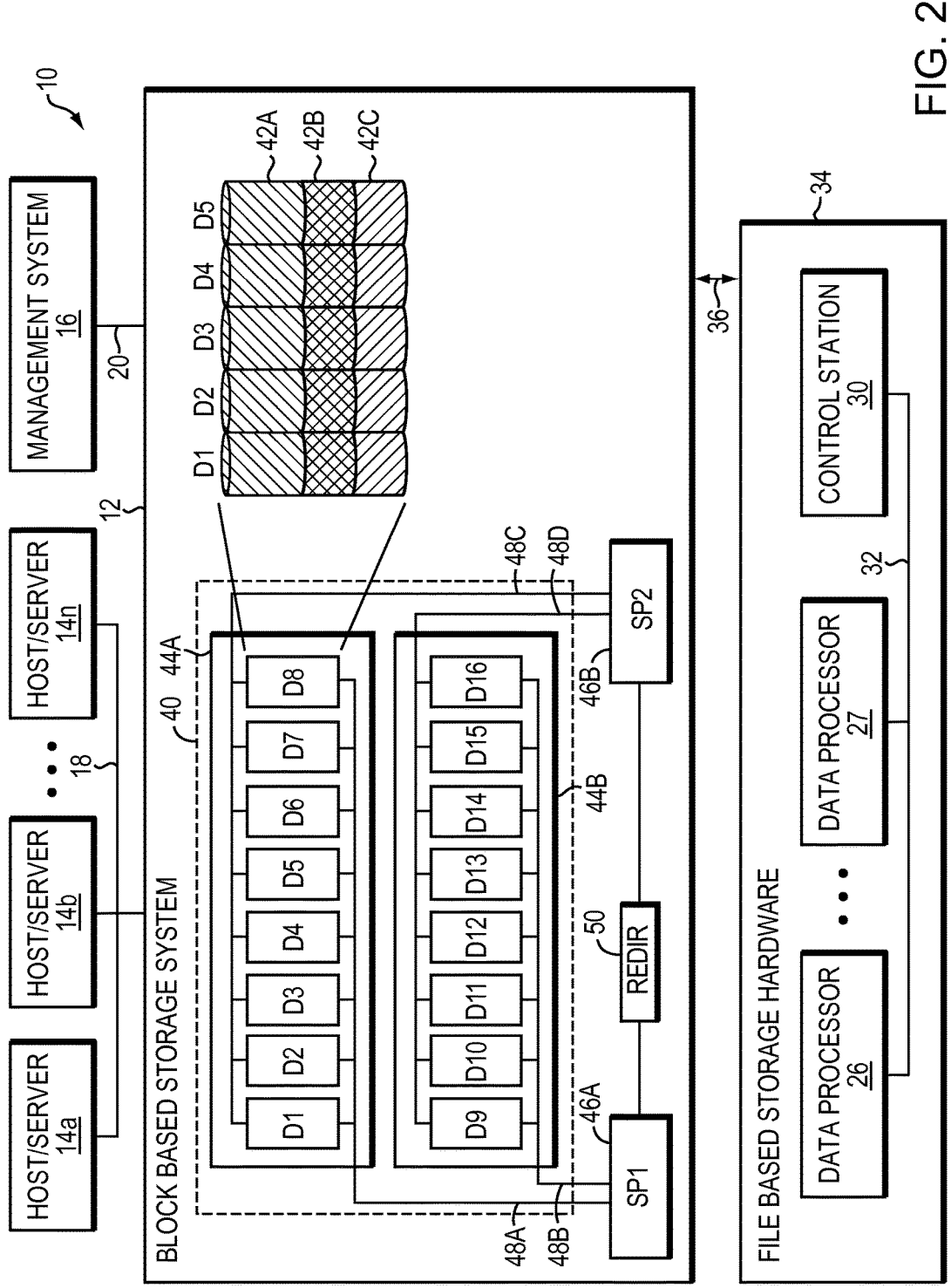

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein. Thus, data storage system 12 may include any number of storage processors.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 3:
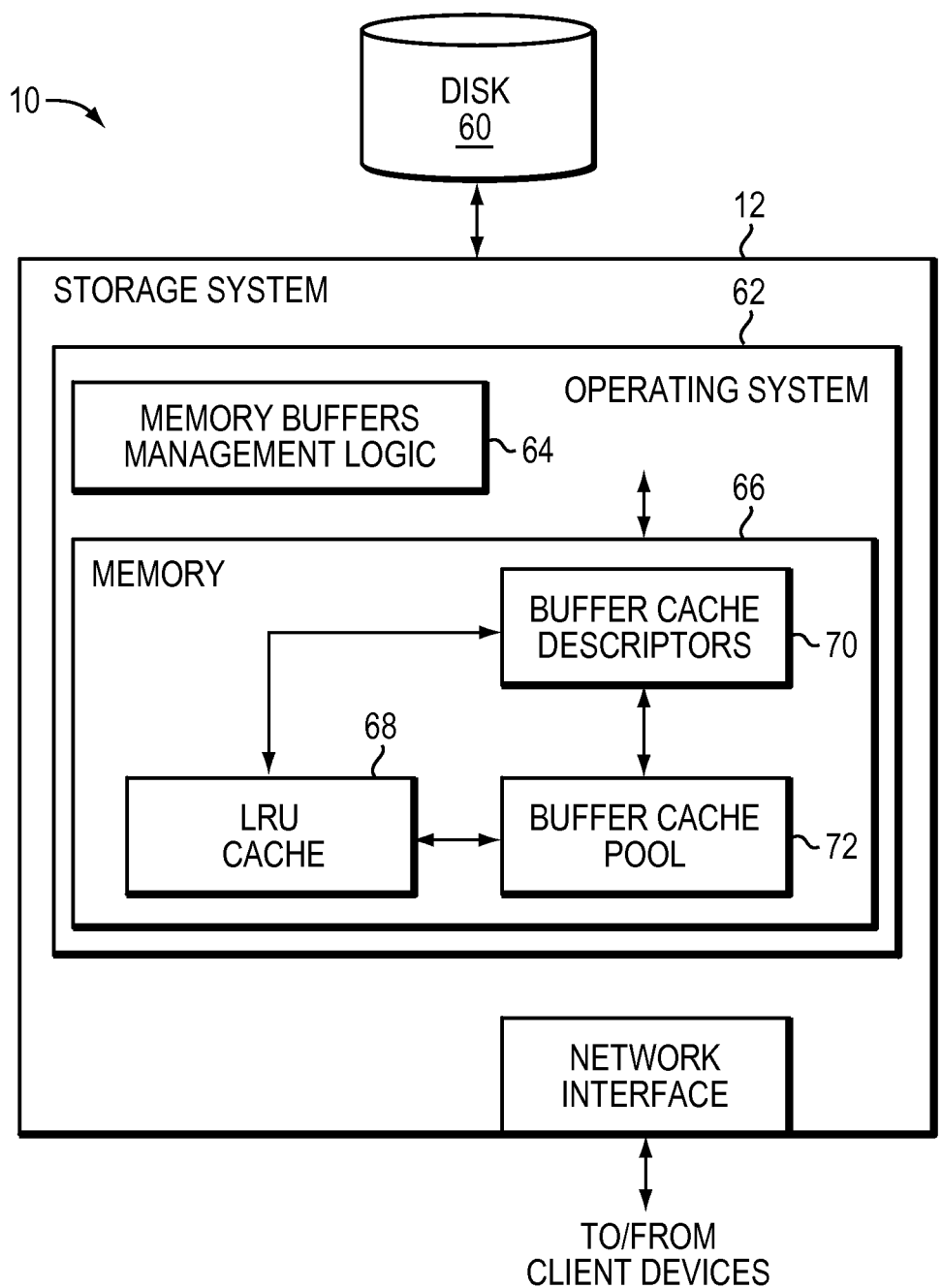
FIGS. 3-6 are diagrams illustrating in more detail components that may be used in connection with techniques herein.

Referring to FIG. 3, shown is more detailed example of an embodiment of a computer system that may be used in connection with performing the techniques described herein.

In at least one embodiment of the current technique, memory buffers management logic 64 manages allocation of pages from a memory of data storage system 12 where the memory may include a volatile memory and nonvolatile memory module.

Referring back to FIG. 3, shown is a block diagram of a storage system of FIGS. 1 and 2 that may be coupled to a storage device 60. The storage device 60 may be, for example, a disk array that stores data (e.g., a file system, a logical volume). A file system is generally a data structure that translates the physical (sector) view of a disk into a logical (files, directories) structure, which helps both computers and users locate files. In other words, it records where files and directories are located on the disk.

The storage device 60 is apportioned into fixed size file system blocks, for organizational purposes. Further, the memory of a data storage system is apportioned into fixed size frames, or pages, for organizational purposes. The terms 'frame' and 'page' will be used interchangeably herein. For example, in at least one embodiment of the current technique, the operating system 62 may apportion the memory into pages of 8 kilobytes (KB). Alternatively, in another embodiment of the current technique, the operating system 62 may apportion the memory into pages of 4 kilobytes (KB). Further, in another embodiment of the current technique, the operating system 62 may apportion memory into pages of 4 megabytes (MB). A file system contains a range of file system blocks that store metadata and data. File system blocks are allocated from storage device 60 for creating files and storing metadata of a file system. In at least some embodiments of the current technique, the file system block may be 8 kilobyte (KB) in size. Thus, in at least one embodiment of the current technique, there may exist 1-1 correspondence between a file system block and a page. However, it should be noted that there may not be a 1-1 correspondence between a file system block and a page.

In at least one embodiment of the current technique, storage system 12 includes memory module 66 (e.g., DRAM memory) that can be viewed as an array of pages. A first portion of the pages are allocated to data structures that are used to support the operating system 62 of the storage system 12. A second portion of the pages are allocated to a buffer cache pool 72, where the buffer cache pool 72 includes a collection of buffer cache blocks such that each buffer cache block may correspond to a page of the memory 66. The remaining pages of memory 66 are so-called 'free' pages available for allocation to applications. The storage system 12 communicates with clients coupled to the storage system 12 via network interface 36. Clients execute applications which access data such as file systems stored on storage devices 60 via the storage system 12. An application may require one or more pages of memory.

The storage system 12 includes several components that are used to allocate pages from the free list to applications. The components may be implemented as software routines, hardware, or a combination thereof. In at least one embodiment of the current technique, buffer cache pool 72 is created by apportioning a portion of memory 66 into buffer cache blocks when operating system 62 of a storage system 12 is initialized during a boot sequence. Further, during initialization of operating system 62, a buffer cache descriptor table 70 is created for managing buffer cache blocks of the buffer cache pool 72. The buffer cache descriptor table 70 includes a buffer cache descriptor entry for each buffer cache block created for buffer cache pool 72. A buffer cache descriptor entry associated with a buffer cache block includes information about the buffer cache block. The information may include the physical address of the buffer cache block, as well as an identifier of a buffer cache queue to which the buffer cache block is allocated. A link to a buffer cache descriptor points to an entry in buffer cache descriptor table 70. In at least one implementation of the current technique, the buffer cache pool 72 may comprise different queues. However, there is no requirement that any particular queue is provided with the buffer cache pool 72. Rather it is appreciated that any number and variety of queues may be provided with the buffer cache pool 72, where each queue is associated with a buffer cache block having a different availability status, ranging from free for pre-emption to unavailable for pre-emption. Memory buffers management logic 64 manages allocation of buffer cache blocks for storing data and/or metadata of a file system.

In at least one embodiment of the current technique, a nonvolatile and persistent memory module may supplement buffer cache pool 72 by providing an additional storage space for caching data and/or metadata of a file system. Further, in at least one embodiment of the current technique, a nonvolatile memory may include a flash memory (e.g. solid state drives, EEPROM (electrically erasable programmable read-only memory)). Further, in at least one embodiment of the current technique, LRU cache (also referred to herein as "least recently used block entries list") 68 may be initialized with a pre-determined number of block entries which can be used upon unable to find any free block entry in a global cache maintained in memory module 66 of storage system 12 and managed by memory buffers management logic 64.

Figure 4:
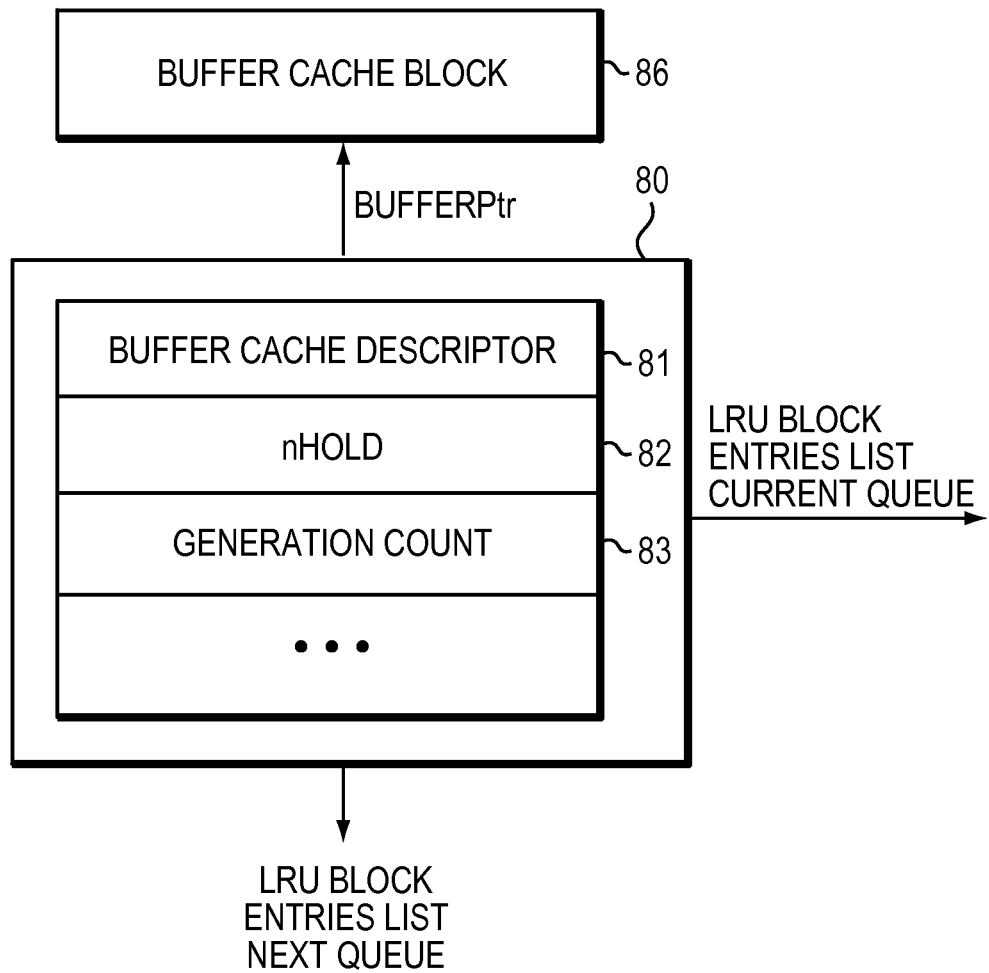

Referring to FIG. 4, shown is a block diagram of a buffer cache descriptor entry that may be included in an embodiment using the techniques described herein. In FIG. 4, the buffer cache descriptor entry 80 includes a page identifier, a current queue field, and a next queue field. The values of the current queue field indicate a queue in which the associated buffer cache block resides. The values of the next queue field indicate a queue to which the associated buffer cache block would be returned to. Thus, the buffer cache descriptor 80 is accessed to determine if the buffer cache block associated with the buffer cache descriptor 80 is in fact available for allocation to an application. Even though a page is allocated to buffer cache pool 72, any buffer cache block that is in a free queue is essentially 'free' for allocation to an application for storing metadata and/or data of a file system. At initialization of operating system 62 of storage system 12, all of the buffer cache descriptor links in a page table are initialized to NULL. When a page is mapped to the buffer cache pool 72, the buffer cache descriptor link for that page in the page table is updated to point to the corresponding buffer cache descriptor entry of buffer cache descriptor table 70. Further, buffer cache descriptor 80 includes nhold 82 and generation count 83 that helps label the buffer cache block 86 with a revision number for creating a hint for the buffer cache block.

Figure 5:
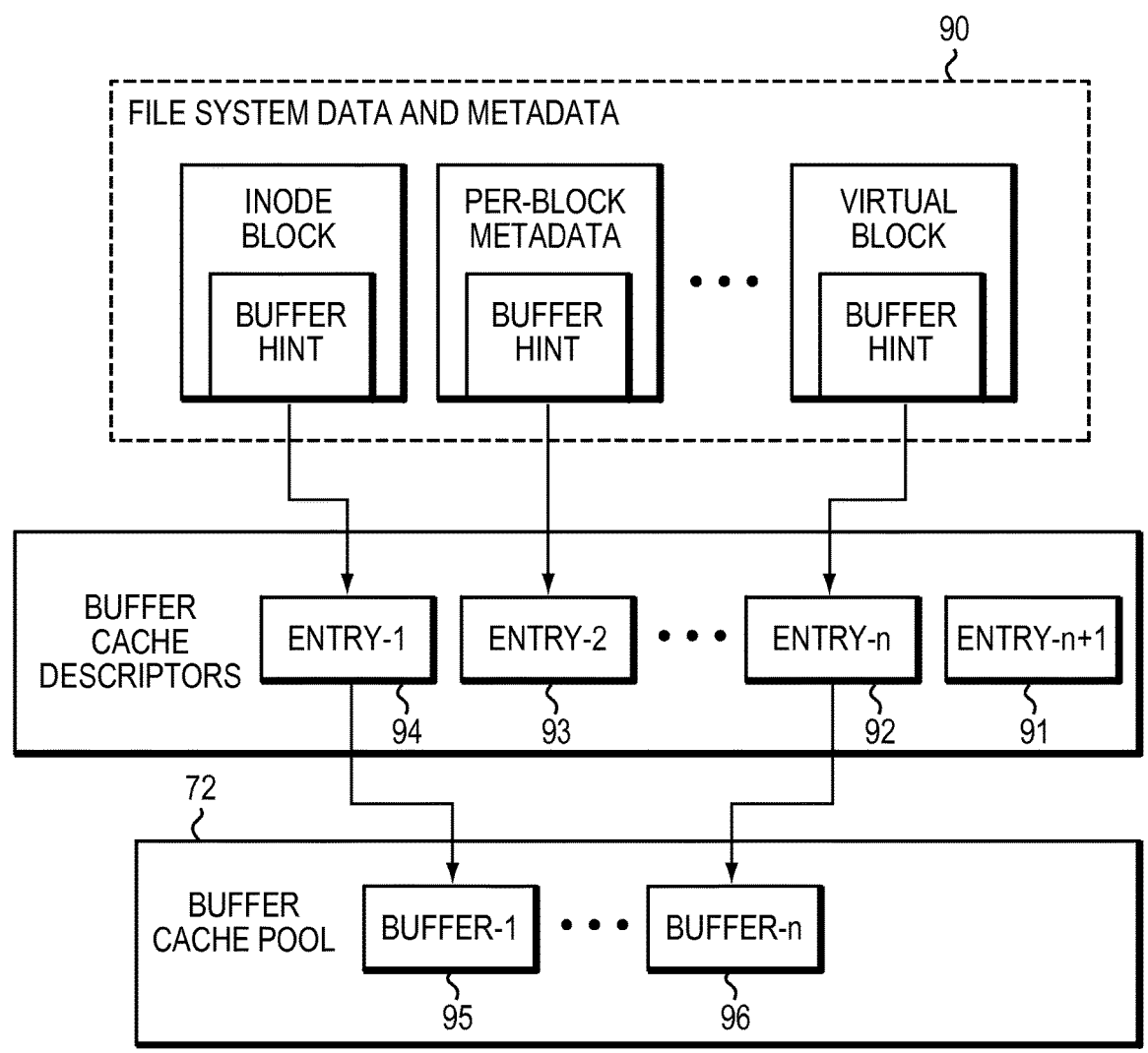

Referring to FIG. 5, shown is a detailed representation of components that may be included in an embodiment using the techniques described herein. In at least one embodiment of the current technique, metadata and/or data of a file system 90 is stored in buffer cache blocks of buffer cache pool 72. Metadata of a file system may include an inode of a file, per-block metadata for file system data blocks, and virtual block for files. Each buffer cache block is represented by a buffer cache descriptor (e.g., 91-94). Further, a buffer cache descriptor associated with a buffer cache block may be included in one of the queues managed by buffer cache pool 72. In at least one embodiment of the current technique, buffer cache pool 72 may include buffer cache blocks 95, 96 that have been used by an application for storing file system data and/or metadata 90 and then released after valid hints are created for the buffer cache blocks. Thus, the application may access data and/or metadata stored in a buffer cache block if a valid hint exists for the buffer cache block at the time the buffer cache block is accessed.

Figure 6:
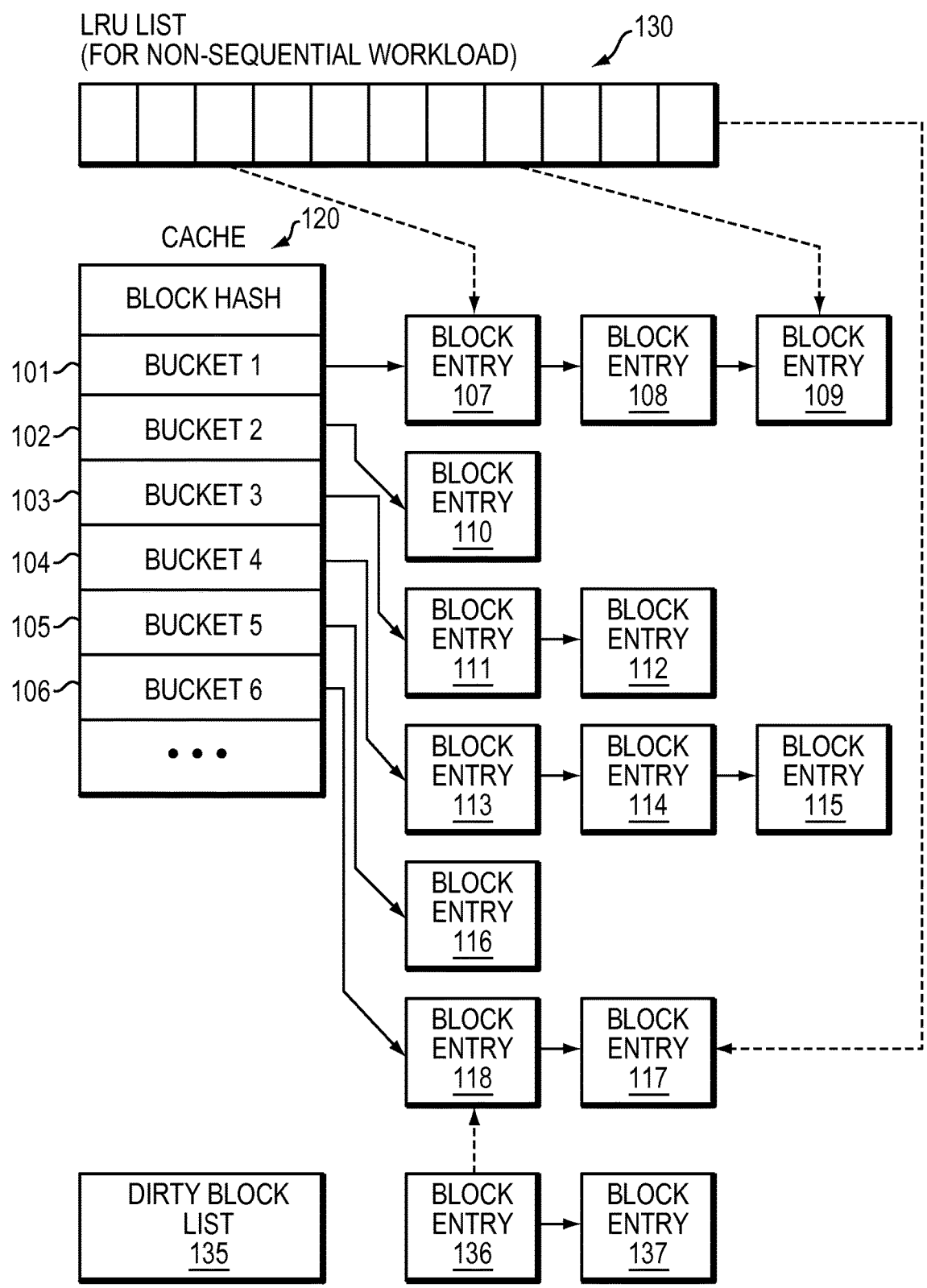

Referring to FIG. 6, shown is a detailed representation of a cache and a least recently used block entries cache/list that may be included in an embodiment using the current techniques described herein. In at least one embodiment of the current technique, storage system 12 includes a cache 120 for storing data and/or metadata such as indirect block entries required for processing tasks (e.g., I/O operations) of a storage workload. For example, cache 120 may be a global cache and organized as a set of hash buckets such that each bucket of the set of hash buckets includes one or more block entries that are accessed by a hash key. In at least one embodiment of the current technique, a hash key may be derived from a file system ID and file system block number of an indirect block entry. Further, as illustrated in FIG. 6, for example, bucket-1 101 refers to block entries 107-109, bucket-2 102 refers to block entry 110, bucket-3 103 refers to block entries 111-112, bucket-4 104 refers to block entries 113-115, bucket-5 105 refers to block entry 116, bucket-6 106 refers to block entries 117-118, and so on. The block hash enables applications that share blocks to be associated with a single instance of a cache entry. Additionally, storage system 12 includes a LRU list, also referred to as "LRU block entries list" 130, of block entries that may be reused by applications if no available block entry is found in cache 120. The cache 120 may grow to a pre-defined size based on an amount of available memory of storage system 12. Further, for example, LRU block entries list 130 refers to buffer cache block entries 107, 109, 117 residing in the cache 120 that may be provided as free block entries when an attempt to find available block entries in the global cache 120 fails.

In at least one embodiment of the current technique, once a block entry is provided to a user or client for storing data and/or metadata of a file system by removing the block entry from the front of the LRU block entries list 130, the block entry is considered as being in use by the user. A block entry is added back to the LRU block entries list 130 as either a reusable or free block entry when a user finishes using the block entry. If a block entry is added back to the LRU block entries list 130 as a free block entry indicating that the block entry may be recycled as a free block entry, the block entry is added at the front of the LRU block entries list 130. If a block entry is added back to the LRU block entries list 130 as a reusable block entry indicating that the block entry may be reclaimed at a later time by a user, the block entry is added at the end of the LRU block entries list 130. Thus, block entries are removed from the front of the LRU block entries list 130 when a new buffer cache block entry is allocated thereby consuming all free block entries before a reusable block entry is recycled as a free block entry. Further, in at least one embodiment of the current technique, cache 120 is instantiated and initialized when storage system 12 boots up.

In at least one embodiment of the current technique, storage system 12 upon receiving a request to find data and/or metadata attempts to find the data and/or metadata in the cache 120 using a reference of the data and/or metadata provided by the user. Storage system 12 searches a set of hash buckets included in a hash table based on a hash key. Further, a cache hit occurs if the data and/or metadata entry ("block entry") is found in the cache 120. A generation count of the reference of the block entry is evaluated to determine whether the block entry has been recycled. If the block entry found in the cache 120 is determined to be a valid entry, the state of the block entry is changed to indicate that the block entry is in use and a reference to the block entry is provided to the user.

Further, a cache miss occurs if a block entry associated with data and/or metadata is not found in the cache 120. In such a case, an attempt is first made to find an available block entry from the cache 120 by selecting a hash bucket and traversing the hash bucket to find an available block entry as described above herein. If an available block entry is not found in the cache 20, a free block entry is allocated from LRU block entry list 130. The state of the free block entry is changed to indicate that the free block entry is in use and a reference to the free block entry is provided to the user. Further, if a block entry is retrieved from LRU block entries list 130, the block entry is added back to LRU block entries list 130 in a least recently used manner when a user of the block entry releases a reference to the block entry. Further, in at least one embodiment of the current technique, each time a block entry is retrieved from or added to LRU block entries list 130, a global lock is acquired and released. Generally, a cache paging mechanism is used for improving system performance and efficient use of memory and CPU processing. Thus, a LRU list 130 in conjunction with a cache 120 performs in such a way that a least accessed entry is reused first.

In at least one embodiment of the current technique, a cache 120 and LRU list 130 is used efficiently in such a way that entries are added to the LRU list 130 for only non-sequential workloads. In at least one embodiment of the current technique, a task of a workload performed on a storage system is associated with a flag indicating whether the task is sequential in nature and based on the flag, file system blocks required for processing the task are added to LRU list 130 and storage for the file system blocks in data and/or metadata cache 120 is managed.

Further, in at least one embodiment of the current technique, a policy of a storage system may make a determination as to how the type of a task of a workload is identified and includes a set of criterion based on which to make a determination as to whether the task of the workload is sequential in nature. Further, in at least one embodiment of the current technique, for example, a policy may take into consideration the size of a LUN or file indicating the amount of data that requires processing. In such a case, if a large amount of data requires processing, a flag indicating a sequential workload may be set in order to avoid consuming a large portion of cache and using a LRU list. However, for example, if a small amount of data requires processing or more than one task of a workload may be executed concurrently, a flag is not updated indicating a non-sequential workload.

In at least one embodiment of the current technique, upon start of an execution of a workload, characteristics of the workload may be evaluated based on a policy and a flag is updated to indicate whether the workload is a sequential workload. It should be noted that the terms "workload" and "task" may be used interchangeably as both the workload and task may include a set of I/O operations for processing file system blocks.

In at least one embodiment of the current technique, execution of tasks included in a workload may include performing a set of I/O operations on data objects (such as a file system block, a LUN). A task of a workload may access data and/or metadata of a file system. Data objects associated with the execution of the task are first searched in a cache 120 of a storage system. A cache 120 may be searched based on a hash key. If a data object required for processing I/O operation of a task is not found in a cache 120 indicating a cache miss, contents of the data object are retrieved from a storage device (e.g., a storage disk). A buffer cache object is allocated from a memory for storing the contents of the data object and stored in the cache 120. If a flag indicating whether the task is sequential in nature is not set, a lock for a LRU list 130 is acquired and the data object is added to the LRU list 130. However, if the flag indicating whether the task is sequential in nature is set indicating that the task is a sequential task, the data object is not added to the LRU list 130. However, if a data object required for processing I/O operation of a task is found in a cache 120 indicating a cache hit, a reference to the data object stored in the cache 120 is increased irrespective of the value of a flag indicating whether the task is a sequential task. In such an example, during processing of a sequential task, a cache may or may not change. Further, when processing of a task of a workload finishes, references to data objects processed by such task are released and decremented.

In at least one embodiment of the current technique, if a cache of a system is not updated by processing of a task and a flag indicating that the task is sequential in nature is set, it may indicate that data objects required for processing of the task has already been residing in the cache 120. In such a case, a reference to a data object required for processing the task is acquired and released after the data object is processed by the task. Further, when the reference to the data object is released, the data object is removed from a hash bucket in the cache 120 and memory used for storing the data object in the cache 120 is reclaimed. Thus, in such a case, the data object is not added to a LRU list 130.

In at least one embodiment of the current technique, if a cache of a system is not updated by processing of a task and a flag indicating that the task is sequential in nature is not set, it may indicate that data objects required for processing of the task may have been residing in the cache 120. In such a case, the data objects stored in the cache 120 of the system may continue to reside in a LRU list 130 and the cache 120 and may either be referenced again at a later time or released when processing of the task finishes.

In at least one embodiment of the current technique, if a cache of a system has been updated upon execution of a workload and includes dirty data objects and a flag indicating that the task is sequential in nature is set, the dirty data objects in the cache may be managed by a separate dirty cache list 135.

In at least one embodiment of the current technique, a range hash mapping mechanism is used for searching and updating data objects that may be required for processing a task in cache 120. Generally, characteristics of a sequential workload include accessing a large number of contiguous data blocks for processing. Further, processing of both sequential and non-sequential workloads may include searching each block required by the workloads in data and/or metadata cache 120 thereby generating a large number of lookup requests and lock requests for accessing hash buckets of the data and/or metadata cache 120 and a LRU list 130 resulting into CPU contention. The range hash mapping mechanism based on the current technique as described herein below improves system throughput, response time of a host I/O, and decreases impact on system resources.

Conventionally, a single data block is mapped to a hash bucket by a hash key in a cache of a system. By contrast, in at least one embodiment of the current technique, a range of data blocks may be mapped to a hash bucket by a single hash key in a cache of a system. In at least one embodiment of the current technique, for example, the block address of a data block may serve as a hash key for a cache where the value of a hash bucket is determined as follows:

hash bucket number=(data block address>>ratio) % total hash bucket size

In at least one embodiment of the current technique, the ratio indicates how many contiguous data blocks may be mapped together by a single hash key. For example, if the ratio is 5, 32 data blocks may be mapped by a single hash key to a single hash bucket. Thus, larger the value of the ratio, more data blocks may be aggregated to a single hash bucket thereby increasing efficiency of a sequential task which requires access to a range of contiguous data blocks for processing.

In at least one embodiment of the current technique, a batch lookup mechanism based on the current technique described herein enables a cache lookup and/or update request to access multiple entries in a single request. In at least one embodiment of the current technique, when execution of a sequential task starts, data blocks associated with the sequential task are apportioned into a set of ranges where each range includes a set of contiguous data blocks that may be mapped to a hash bucket by using a range hash as described above herein. Further, a set of threads may be executed concurrently on the set of ranges that may pre-load data objects in a cache concurrently where each thread may target different hash buckets of the cache. Thus, a batch lookup API attempts to find a set of contiguous blocks in a cache of a system by using a range hash computation as described above herein. In at least one embodiment of the current technique, a cache lookup may be performed in two steps where during the first step, data objects found in a cache indicating cache hits are tracked using an internal bitmap and during the second step, memory for new entries is allocated for storing data objects that have not been found in the cache indicating cache misses. Further, in such a case, a hash bucket is locked, the data objects are added to the hash bucket, the hash bucket is unlocked, and contents of the data objects are then retrieved from a storage device and stored in the newly allocated entries in the cache. Further, if a flag indicating that the task is sequential in nature is set, the newly allocated cache entries are not added into a LRU list 130 and memory allocated for such entries is reclaimed when the sequential task finishes processing such entries. Thus, searching a range of entries together by using a batch lookup mechanism as described herein reduces the amount of time and overhead involved in searching entries in a cache and reduces the number of times a lock of hash buckets in the cache is acquired and released.

Thus, in at least one embodiment of the current technique, by avoiding using a LRU list for a sequential task, locking overhead involved in adding and removing entries to the LRU list is eliminated or reduced thereby reducing consumption of a CPU of a storage system. Further, by reclaiming memory allocated for entries in a cache for a sequential task improves usage efficiency of the cache and reduces impact on other tasks executing concurrently in a system. Further, a priority or quality of service (QoS) characteristics of a task may be taken into account for determining whether to identify the task as a sequential task. Further, a range hash and batch lookup mechanisms as described above herein reduces load on a cache of a system, reduces overhead involved in acquiring and releasing locks of hash buckets of the cache and improves overall throughput of a sequential task. Further, the current techniques described above herein may enable execution of both sequential and non-sequential tasks without or with minimal additional complexity. It should be noted that a cache system as described above herein may store data and/or metadata and may be a part of a production storage system and/or a backup system. Further, any number of sequential tasks may employ the current techniques as described above herein.

Figure 7:
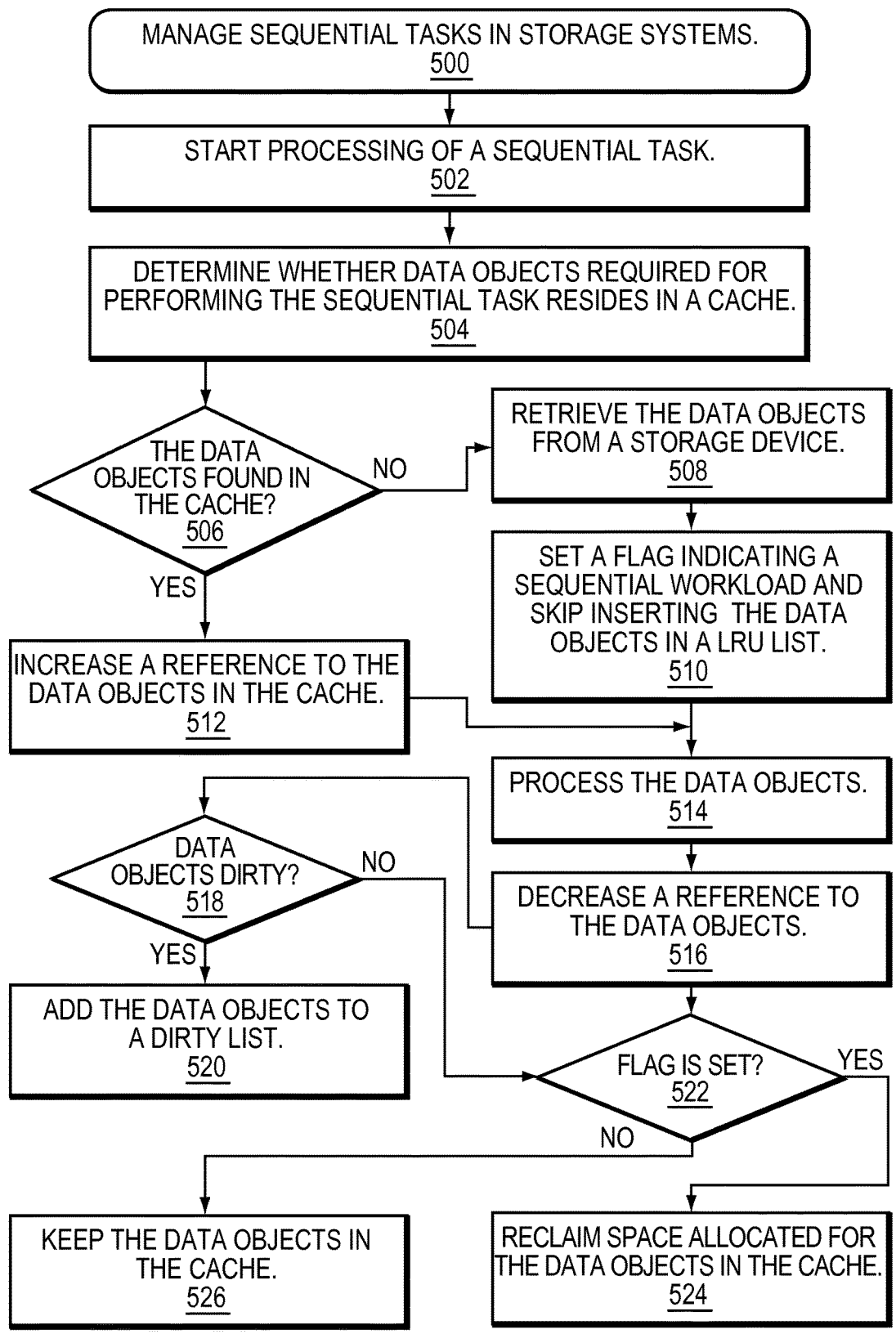
FIGS. 7-8 are flow diagrams illustrating processes that may be used in connection with techniques herein.

Referring to FIG. 7, shown is a more detailed flow diagram illustrating managing processing tasks in storage systems. With reference also to FIGS. 1-6, in at least one embodiment of the current technique, tasks of a workload in a storage system are managed using cache 120 and LRU block entries list 130 (step 500). The storage system 12 may receive a workload from a host which may include a set of tasks, each task including a set of I/O operations to be performed on storage objects (e.g., a file, a LUN, data blocks of a file) (step 502). A determination is made as to whether a data object (also referred to herein as "storage objects") required for performing the tasks of the workload resides in the cache 120 (step 504). If the data object is found in the cache 120 indicating a cache hit (step 506), a reference to the data object is increased and provided to a user (e.g., a host) for processing (step 512). However, if the data object is not found in the cache, contents of the data object are retrieved from a storage device (step 508). A determination is made based on a policy as to whether the tasks of the workload is sequential in nature and upon finding that the tasks of the workload is sequential in nature, a task flag is updated indicating that the workload is a sequential workload (step 510). Thus, based on the task flag, the data object is not added to LRU list 130.

In at least one embodiment of the current technique, a data object may be processed by performing an I/O operation on the data object (step 514). When a user finishes using the data object, the reference to the data object is decreased (step 516). A determination is then made as to whether the data object is a dirty data object (step 518). When updates to a data object cached in a cache are not flushed to a storage device, the data object is considered a dirty data object. Upon determining that the data object is dirty, the data object is added to a dirty list 135. However, upon determining that the data object is not dirty, the task flag is evaluated to determine whether the task flag has been set indicating a sequential workload (step 522). If the task flag has been set, the data object is removed from the cache 120 by reclaiming memory allocated to the data object (step 524). However, if the task flag has not been set, the data object remains in the cache 120 such that subsequent tasks of the workload may access the data object at a later time (step 526).

Figure 8:
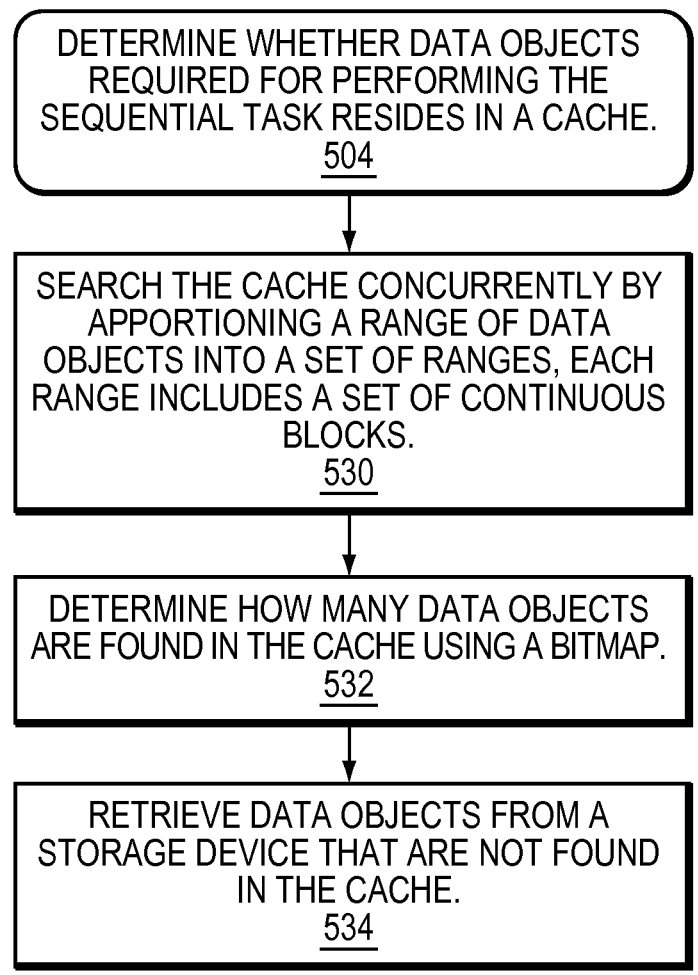

Referring to FIG. 8, shown is a more detailed flow diagram illustrating managing processing tasks in storage systems. With reference also to FIGS. 1-7, in at least one embodiment of the current technique, a determination is made as to whether data objects required for performing tasks of a workload resides in the cache 120 by using a batch lookup mechanism that uses a range hash (step 504). The cache 120 is apportioned into a set of ranges where each range include a set of contiguous data objects (e.g., file system blocks) and each range of the set of ranges is searched concurrently by using a set of threads (step 530). A bitmap is used to track the number of data objects that are found in the cache 120 with bits set in the bitmap corresponding to a subset of data objects that have been found in the cache 120 (step 532). The bitmap is evaluated to determine how many and which data objects have not been found in the cache 120 and such data objects are retrieved from a storage device (step 534).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing processing tasks in storage systems, the method comprising:
   receiving a task from a host of a storage system, wherein the task includes a set of Input/output (I/O) operations, wherein the set of I/O operations are performed on storage objects organized on the storage system;
   evaluating characteristics of the task for identifying a type of the task; and
   based on the type of the task identified based on the evaluation, making a determination as to whether to add data objects required for performing the task to a reusable object list organized in the storage system, wherein the reusable object list and a cache of the storage system is used for providing access to the data objects, wherein the cache is configured to store the data objects, wherein a portion of a memory of the storage system is reserved as the cache.

2. The method of claim 1, wherein a data object is added to the reusable object list in a least recently used manner, wherein the reusable object list includes a linked list, wherein the linked list includes a set of buffer cache objects for storing contents of the data objects, wherein each buffer cache object of the set of buffer cache objects is allocated from the cache for storing contents of a data object.

3. The method of claim 1, wherein the cache is organized based on a buffer cache pool, wherein the buffer cache pool is associated with a buffer cache descriptor table for storing availability information for each buffer cache object of a set of buffer cache objects included in the buffer cache pool, wherein the buffer cache descriptor table includes a set of buffer cache descriptor entries, wherein a buffer cache descriptor entry of the set of buffer cache descriptor entries is associated with a buffer cache object of the set of buffer cache objects.

4. The method of claim 1, wherein the cache includes a set of hash buckets, each hash bucket of the set of hash buckets includes a list of buffer cache objects.

5. The method of claim 1, further comprising:
   determining whether the type of the task is a sequential workload, wherein the sequential workload includes a set of I/O operations that access a set of data objects in a sequential pattern; and
   based on the determination, avoid adding data objects required for performing the task to the reusable object list.

6. The method of claim 1, further comprising:
   determining whether the type of the task is a sequential workload, wherein the sequential workload includes a set of I/O operations that access a set of data objects in a sequential pattern; and
   based on the determination, removing the data objects from the cache upon processing of the task.

7. The method of claim 1, further comprising:
   determining whether the data objects required for performing the task resides in the cache; and based on the determination, searching the cache by apportioning data residing in the cache into a set of ranges, wherein each range includes a set of contiguous objects, wherein each range is evaluated concurrently.

8. The method of claim 7, wherein a bitmap is used to track availability of the data objects in the cache.

9. The method of claim 1, wherein a task includes an I/O operation performed on a file of a file system.

10. The method of claim 1, wherein a data object associated with a task includes a file system block of a file of a file system.

11. A system for use in managing processing tasks in storage systems, the system comprising a processor configured to:
  receive a task from a host of a storage system, wherein the task includes a set of Input/output (I/O) operations, wherein the set of I/O operations are performed on storage objects organized on the storage system;
  evaluate characteristics of the task for identifying a type of the task; and
  based on the type of the task identified based on the evaluation,
  make a determination, based on the task identified based on the evaluation, as to whether to add data objects required for performing the task to a reusable object list organized in the storage system, wherein the reusable object list and a cache of the storage system is used for providing access to the data objects, wherein the cache is configured to store the data objects, wherein a portion of a memory of the storage system is reserved as the cache.

12. The system of claim 11, wherein a data object is added to the reusable object list in a least recently used manner, wherein the reusable object list includes a linked list, wherein the linked list includes a set of buffer cache objects for storing contents of the data objects, wherein each buffer cache object of the set of buffer cache objects is allocated from the cache for storing contents of a data object.

13. The system of claim 11, wherein the cache is organized based on a buffer cache pool, wherein the buffer cache pool is associated with a buffer cache descriptor table for storing availability information for each buffer cache object of a set of buffer cache objects included in the buffer cache pool, wherein the buffer cache descriptor table includes a set of buffer cache descriptor entries, wherein a buffer cache descriptor entry of the set of buffer cache descriptor entries is associated with a buffer cache object of the set of buffer cache objects.

14. The system of claim 11, wherein the cache includes a set of hash buckets, each hash bucket of the set of hash buckets includes a list of buffer cache objects.

15. The system of claim 11, further comprising:
  determine whether the type of the task is a sequential workload, wherein the sequential workload includes a set of I/O operations that access a set of data objects in a sequential pattern; and
  avoid adding, based on the determination, data objects required for performing the task to the reusable object list.

16. The system of claim 11, further comprising:
  determine whether the type of the task is a sequential workload, wherein the sequential workload includes a set of I/O operations that access a set of data objects in a sequential pattern; and
  remove, based on the determination, the data objects from the cache upon processing of the task.

17. The system of claim 11, further comprising:
  determine whether the data objects required for performing the task resides in the cache; and
  search, based on the determination, the cache by apportioning data residing in the cache into a set of ranges, wherein each range includes a set of contiguous objects, wherein each range is evaluated concurrently.

18. The system of claim 17, wherein a bitmap is used to track availability of the data objects in the cache.

19. The system of claim 11, wherein a task includes an I/O operation performed on a file of a file system.

20. The system of claim 11, wherein a data object associated with a task includes a file system block of a file of a file system.

* * * * *